United States Patent
Yoo et al.

(10) Patent No.: US 6,445,742 B1
(45) Date of Patent: Sep. 3, 2002

(54) METHOD AND APPARATUS FOR TRANSMITTING AND RECOVERING VIDEO SIGNAL

(75) Inventors: Kook-yeol Yoo, Suwon; Dong-seek Park, Taegu, both of (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/432,425

(22) Filed: Nov. 2, 1999

(30) Foreign Application Priority Data

Nov. 2, 1998 (KR) .............................. 98-46825

(51) Int. Cl.⁷ ................................. H04B 1/66
(52) U.S. Cl. ........................ 375/240.27; 375/240.16
(58) Field of Search .................... 348/423.1, 425.2, 348/425.4, 402.1, 407.1, 416.1, 417.1, 418.1, 431.1, 434.1, 533; 375/240.27, 240.28, 240.16, 240.23, 240.15; 370/100.1; 382/252, 236, 275, 308, 238; 709/247

(56) References Cited

U.S. PATENT DOCUMENTS

| | | | |
|---|---|---|---|
| 5,168,356 A | * 12/1992 | Acampora et al. | 375/240.15 |
| 5,703,697 A | 12/1997 | Normile | 358/433 |
| 5,768,533 A | * 6/1998 | Ran | 709/247 |
| 6,052,150 A | * 4/2000 | Kikuchi et al. | 375/240.16 |
| 6,111,916 A | * 8/2000 | Talluri et al. | 375/240.2 |

FOREIGN PATENT DOCUMENTS

EP    0 944 263 A1    9/1999 ............ H04N/7/26

OTHER PUBLICATIONS

Naoto Matoba et al., Low Delay, Error Resilient Error Control for Mobile Video Communication; Global Telecommunication Conference; 1997; vol. 2, pp. 1032–1036.

K–Y Yoo; "Adaptive Resynchronization Marker Positioning Method For Error Resilient Video Transmission"; Electronics Letters, The Institution of Electrical Engineers; Oct. 29, 1998, vol. 34, No. 22, pp. 2084–2085.

* cited by examiner

*Primary Examiner*—Chris Kelley
*Assistant Examiner*—Gims Philippe
(74) *Attorney, Agent, or Firm*—Sughrue Mion, PLLC

(57) ABSTRACT

A method and an apparatus for transmitting and recovering a video signal are provided. The method for transmitting a video signal that has a hierarchical structure of a frame, groups of blocks (GOBs), and macro blocks includes a transmitter inserting a plurality of resynchronization markers into each GOB to prevent the propagation of errors generated in a transmission channel. The insertion of the resynchronization markers includes assigning the number of resynchronization markers to the respective GOBs and inserting the assigned resynchronization markers into predetermined positions of the corresponding GOB. The positions are determined to minimize the mean error propagation cost based on whether respective macro blocks positioned between the resynchronization markers to be inserted are skipped.

The present invention make it possible to prevent the propagation of an error when a video signal is transmitted over an error prone mobile network or radio network.

8 Claims, 3 Drawing Sheets

METHOD AND APPARATUS FOR TRANSMITTING AND RECOVERING VIDEO SIGNAL

BACKGROUND OF THE INVENTION

1. Field of the Invention

The present invention relates to transmission and recovery of a video signal, and more particularly, to a method and an apparatus for transmitting and recovering an error-resilient video signal in an error-prone channel.

2. Description of the Related Art

When an image bit stream is encoded using an H.261, an H.263 ver. 1,2, and 3, or an MPEG-4 encoder, variable length coding (VLC) is used in order to obtain a high compression rate. In this situation, when some bits are erroneous in the bit stream, decoding of the bit stream after the erroneous bit becomes impossible in a decoder. This is called error propagation. In this situation, correct decoding becomes possible after a resynchronization marker is generated after the bit containing the error.

In current standard methods for reducing error propagation, resynchronization markers, such as a slice start code and a group of blocks (GOB) start code (GBSC), are inserted into predetermined positions of the encoded bit stream, for example, starting sections of respective frames, slice starting sections when using a slice hierarchy, and GOB starting sections when using a GOB hierarchy.

However, more resynchronization markers should be inserted into a bit stream transmitted over a radio channel in which errors are more frequently generated. When the number of the resynchronization markers to be inserted is predetermined, the positions into which the resynchronization markers are to be inserted in the bit stream should be determined.

In order to conceal the GOB in which the error is generated during the recovery of a received video signal, all Macro Blocks (MBs) between the GBSC of the GOB in which the error is generated and the GBSC of the next GOB decoded thereafter, are recovered using the motion vectors of MBs of a previous GOB, in a conventional technology. FIG. 1 shows the data structure of the above-mentioned error concealment method. As shown in FIG. 1, the GBSC is sensed in the received bit stream and is decoded in respective GOBs 100, 102, 104, and 106. The value gn denotes a GOB number. The decoded GOBs 108, 110, 112, and 114 are recovered at each corresponding position of a frame 116. Here, when it is determined that the second GOB 102 has an error as a result of checking the GBSC of the third GOB 104, the decoded second GOB 110 is deleted. Then, the second GOB 110 is recovered by performing motion compensation using motion vectors in the first GOB 100.

However, since a resynchronization marker is defined only as the GBSC in a GOB header which is the starting point of the GOB in such a method, it is noted that the error propagates through at least one GOB.

Also, at the receiving end, a video signal is recovered by using motion vectors of transmitted MBs. Here, when an error is generated in the motion vectors of the MBs which are being recovered, the erroneous motion vector is predicted from the motion vectors of the MBs of a previous GOB. The prediction is performed by obtaining a median of the motion vectors of recovered MBs among peripheral blocks of the current MB. However, when the previous GOB is lost, it is difficult to recover the current MB since the prediction value of the motion vector of the current MB becomes 0.

Also, when an error is generated in a field showing the position of MBs in the GOB header or the slice header, the correct position of a block picture cannot be recovered from the corresponding MB due to the error. Therefore, a method for determining whether an error is generated in the field is required.

SUMMARY OF THE INVENTION

To solve the above problem, it is an object of the present invention to provide a method and an apparatus for transmitting a video signal in which resynchronization markers, which are shorter than a GOB, are also inserted into predetermined positions of a bit stream, other than the starting parts of a frame and a GOB, to prevent error propagation.

It is another object of the present invention to provide a method for recovering a video signal in which error-generated MBs are concealed.

Accordingly, to achieve the first object, there is provided a method for transmitting a video signal, wherein before a video signal having a hierarchical structure of a frame, groups of blocks (GOBs), and macro blocks is received and recovered, a transmitter inserts a plurality of resynchronization markers into each GOB to prevent the propagation of errors generated in a transmission channel, wherein the insertion of resynchronization markers includes: assigning the number of resynchronization markers to the respective GOBs and inserting the assigned resynchronization markers into predetermined positions of the corresponding GOB, wherein the positions are determined to minimize the mean error propagation cost based on whether respective macro blocks positioned between the resynchronization markers to be inserted are skipped.

To achieve the first object, there is provided a video signal transmitting apparatus for inserting a plurality of resynchronization markers into groups of blocks (GOBs) to prevent the propagation of errors generated in a transmission channel before a video signal, having a hierarchical structure of a frame, the GOBs, and macro blocks, is received and recovered, including: an encoder for encoding image data; a frame code storing unit for storing respective CODed macro block indication (COD) values determined by the encoder; a frame bitstream storing unit for storing a bit stream generated by the encoder; a resynchronization marker generator for determining the number and positions of the resynchronization markers to be inserted into the bit stream based on the COD values stored in the frame code storing unit and generating the resynchronization markers; and a resynchronization marker inserting unit for inserting the generated resynchronization markers into corresponding positions of the stored bit stream and transmitting the generated resynchronization markers.

To achieve the second object, there is provided a method for recovering a received video signal having a hierarchical structure of a frame, groups of blocks (GOBs), and macro blocks by inserting a plurality of resynchronization markers into the GOBs to prevent the propagation of errors generated in a transmission channel, including: detecting an error from a macro block between inserted resynchronization markers; deleting recovered data of a section in which the error is detected; and concealing the error of the section by replacing the deleted data section with the data of the immediately preceding concealed section.

To achieve the second object, there is provided a video signal recovering method for recovering an image from received motion vectors of the respective micro blocks of the video signal having a structure of a frame, groups of blocks (GOBs) and macro blocks, wherein the motion vector of an erroneous macro block is predicted by replacing the motion vector with the immediately preceding recovered motion vector.

To achieve the second object, there is provided a video signal recovering method for recovering a macro block in a position by reading a field showing the position of the macro block among headers of the block group in a video signal having a frame, GOBs, and macro blocks, wherein it is determined whether an error is generated in a field showing the position of the macro block by performing a parity check with respect to the macro block from the received video signal including a parity bit inserted into the field showing the position of the macro block.

BRIEF DESCRIPTION OF THE DRAWINGS

The above objectives and advantages of the present invention will become more apparent by describing in detail a preferred embodiment thereof with reference to the accompanying drawings in which.

DESCRIPTION OF THE PREFERRED EMBODIMENTS

Figure 1:
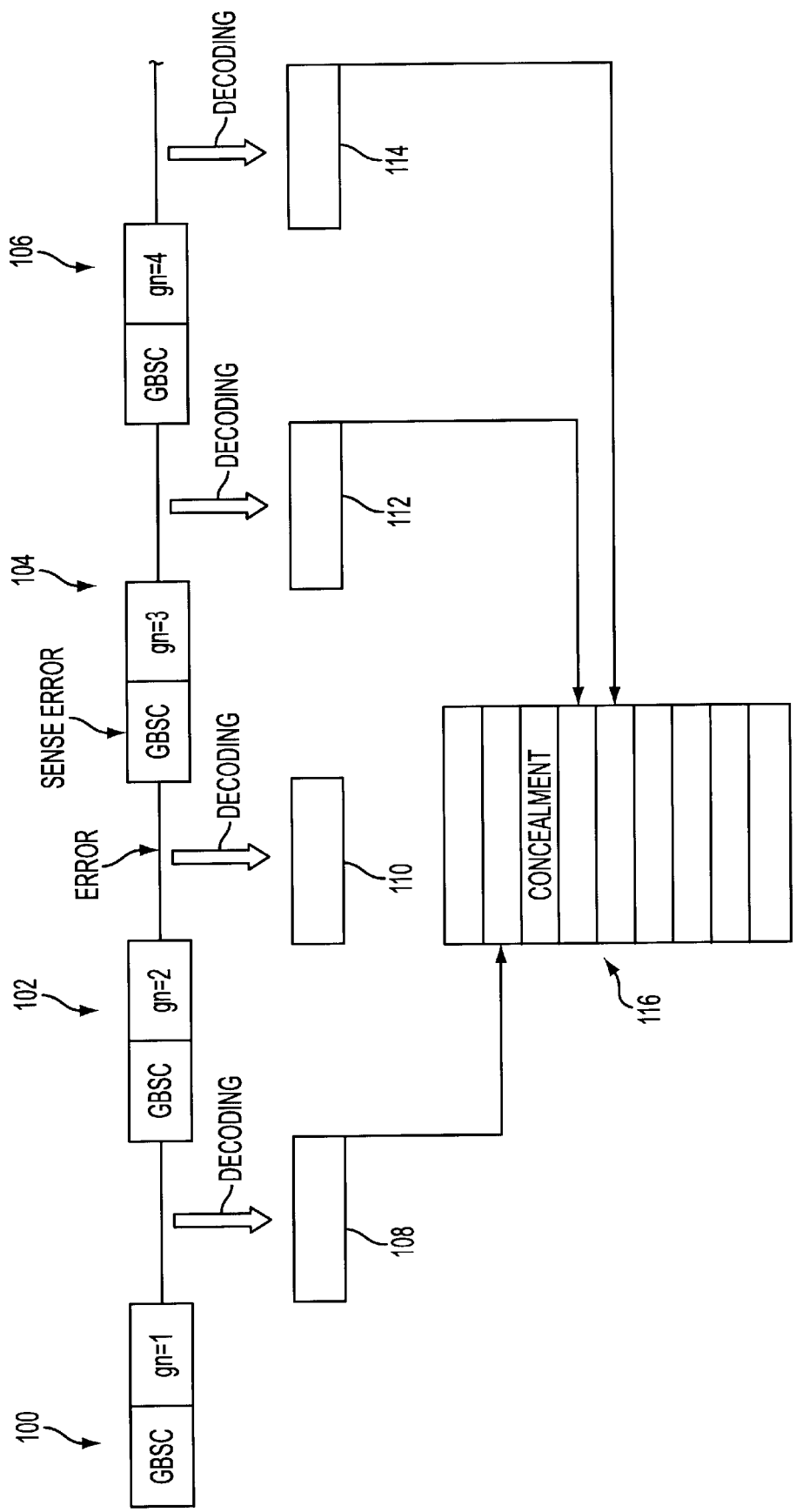
FIG. 1 shows the data structure of a conventional error concealment method.
Figure 2:
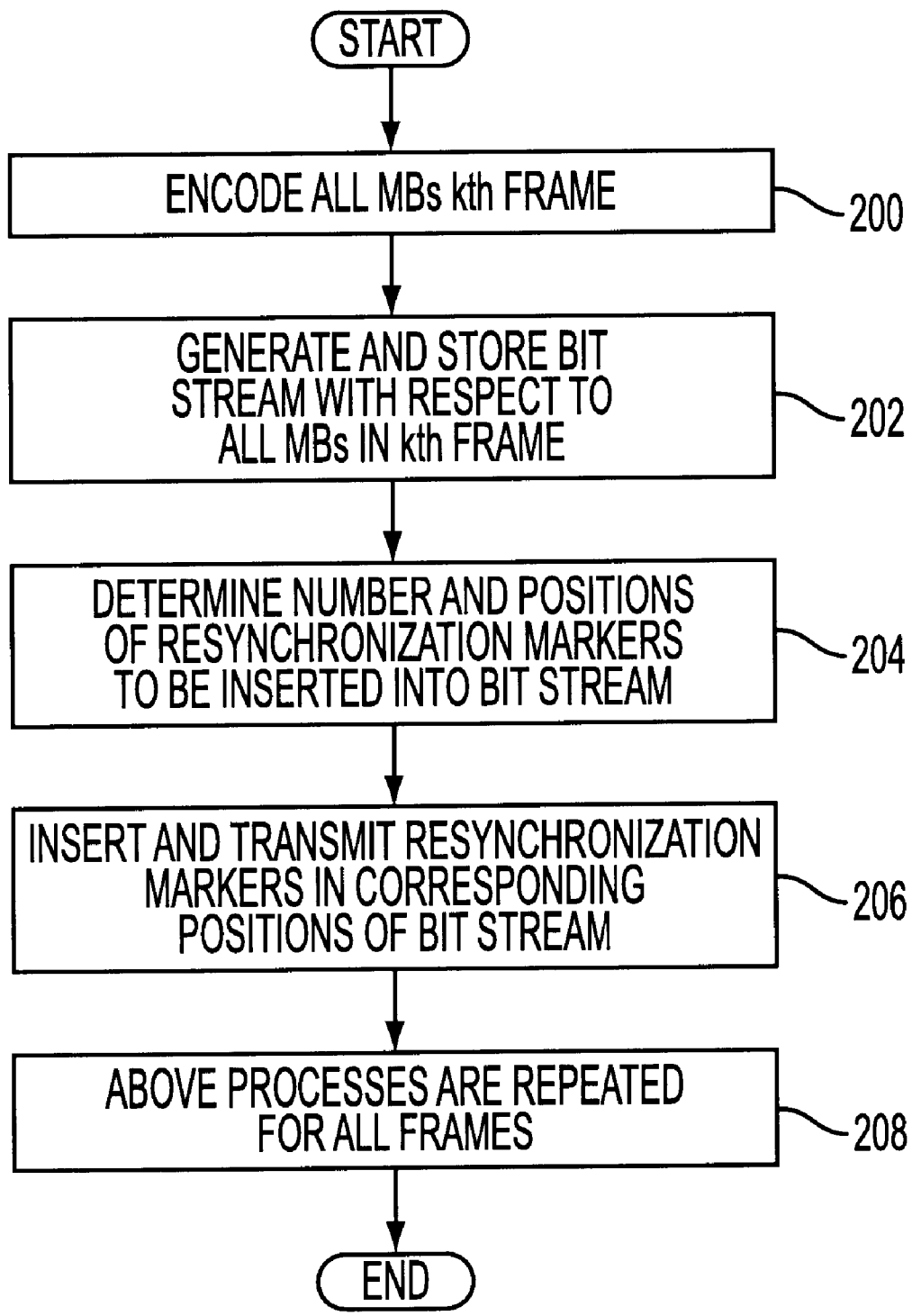
FIG. 2 is a flowchart showing a video signal transmitting method according to the present invention.

Hereinafter, an embodiment of the present invention will be described in more detail with reference to the drawings. FIG. 2 is a flowchart showing a video signal transmitting method according to the present invention.

All MBs of a kth frame are encoded (step 200). The encoding is performed by a variable length coding (VLC) method. Bit streams with respect to all the MBs encoded in the kth frame are generated and stored (step 202). The number and positions of the resynchronization markers to be inserted into predetermined positions of the stored bit streams are determined (step 204). The resynchronization markers are inserted into the determined positions of the bit stream and are transmitted (step 206). The above processes are repeated for all frames (step 208).

A process of determining the number and positions of the resynchronization markers to be inserted, described in the step 204, is as follows. First, the number of resynchronization markers to be inserted into the respective GOBs is determined. The number $r_j0$ of resynchronization markers assigned to a jth GOB is determined as shown in the following equation.

$$r_j = nint\left(R_F \times \frac{N_j}{N_F}\right) \quad (1)$$

wherein, $N_j$ and $N_F$ represent the number of MBs which are not skipped in a jth GOB and the number of MBs which are not skipped in a frame, respectively. $R_F$ is the number of resynchronization markers assigned to a frame and is determined by the error generation frequency of a network. The expression nint $$nint\left(R_F - \frac{N_j}{N_F}\right)$$

is a nearest integer truncation operator. For example, nint (5.2)=5 and nint(5.6)=6.

The number $r_j$ of resynchronization markers assigned to the jth GOB is determined by the expression $r_j$=max{min($r_j$, $N_j$−1), 0}. This is because $r_j$ should be corrected since at least one skipped marker exists between the resynchronization markers in the case of a GOB in which $r_j$>$N_j$.

The positions into which the resynchronization markers assigned in the jth GOB are inserted are determined as follows. For example, when there is a bit error in a kth MB of the jth GOB, all MBs from the kth MB to the next resynchronization marker cannot be correctly decoded due to loss of VCL decoding synchronization. Then, correct decoding is performed after the next resynchronization marker. Due to the above-described error, error propagation cost $E_j$ can be represented by the number of lost MBs in the jth GOB.

$$E_j = \sum_{i=1}^{m} c(i, j) \quad (2)$$

wherein, $$c(i, j) = \begin{cases} 1, & i\text{th MB is not skipped in } j\text{th GOB} \\ 0, & i\text{th MB is skipped in } j\text{th GOB} \end{cases}$$

m is the number of MBs in the GOB.

c(i, j) is a binary complement of a CODed macro-block indication (COD) in an H.263 Syntax. COD is 1 if the ith MB is a skipped MB and 0 if the ith MB is a non-skipped MB. The value m is the number of MBs in the GOB. When c(i, j) is 0, it means that the ith MB is skipped and that MB can be decoded without being affected by a channel error by being replaced with the value of the MB in the same position in a previous frame.

In order to statistically express the error propagation cost, when it is assumed that the error generation rates of the respective MBs are the same, and when the error generation probability is $P_e$, the following mean error propagation cost $\overline{E}_{o,j}$ can be obtained.

$$\overline{E}_{0,j} = p_e \sum_{i=1}^{m} E_0(i, j) \quad (3)$$

$$= p_e \sum_{i=1}^{m} \sum_{k=i}^{m} c_n(k, j)$$

According to Equation 3, the error propagation cost of each GOB depends on the number of non-skipped MBs in the GOB. For example, when all the MBs in the GOB are skipped, it is not as effective to insert the resynchronization markers. When the number of non-skipped MBs in one GOB is larger than the number of non-skipped MBs in another GOB, more resynchronization markers should be assigned to the GOB having more non-skipped MBs in order to make the two GOBs have substantially the same mean error propagation costs.

A case in which one resynchronization marker is used in each GOB will be compared with a case in which two resynchronization markers are used. It is assumed that all the MBs are non-skipped in order to simplify the explanation. When one resynchronization marker is inserted into each GOB, the mean error propagation cost is obtained from Equation 3 as follows.

$$\overline{E}_{0,j} = p_e \sum_{i=1}^{m}(m-i+1) \qquad (4)$$
$$= \frac{m(m+1)}{2}p_e$$

If one resynchronization marker is inserted into the GOB after the kth MB, the mean error propagation cost is as follows.

$$\overline{E}_{1,j}(k) = p_e \sum_{i=1}^{k}(k-i+1) + p_e \sum_{i=k+1}^{m}(m-i+1) \qquad (5)$$
$$= \frac{p_e}{2}(2k^2 - 2mk + m^2 + m)$$

According to Equation 5, the mean error propagation cost varies according to the position of the additional resynchronization marker which is inserted. The position k* of the resynchronization marker which minimizes the mean error propagation cost according to the additionally inserted resynchronization markers is obtained from Equation 5 as follows.

$$k^* = m/2 \qquad (6)$$

Here, the mean error propagation cost is obtained as follows.

$$\overline{E}_{1,j}(k^*) = \frac{m(m+1)}{2}p_e - \frac{m^2}{4}p_e \qquad (7)$$

According to Equation 7, it is noted that the mean error propagation cost is reduced when one more resynchronization marker is used in the GOB. Also, according to Equation 6, it is noted that the position of the resynchronization marker which minimizes the mean error propagation cost is in the middle of the GOB.

Assuming that the number of the additionally inserted resynchronization markers is r, that r resynchronization markers are assigned to the jth GOB, and that the positions of the respective markers are $k_1, k_2, \ldots, k_r$, if all the MBs of the jth GOB are not skipped, the respective MBs have the same error probability $P_e$. Here, the mean error propagation cost is as follows.

$$\overline{E}_{r,j}(k_1, \ldots, k_r) = \qquad (8)$$
$$\sum_{i=1}^{k_1}(k_1-i+1)p_e + \sum_{i=k_1+1}^{k_2}(k_2-i+1)p_e + \ldots + \sum_{i=k_{r-1}+1}^{k_r}(k_r-i+1)p_e +$$
$$\sum_{i=k_r+1}^{m}(m-i+1)p_e = \left(2\sum_{i=1}^{r}k_i^2 - 2\sum_{i=1}^{r-1}k_ik_{i-1} - 2mk_r + m^2 + m\right)p_e$$

The position $k^*_i$ of the resynchronization marker is determined as follows when a solution is obtained by differentiating $k_i$ (i=1,2, . . . , r).

$$k^*_i = \frac{m}{r+1}i, i \in [1, 2, \ldots, r] \qquad (9)$$

According to the characteristic of the skipped MB, m is the number $N_j$ of MBs which are not skipped in the jth GOB and r is $r_j$.

Figure 3:
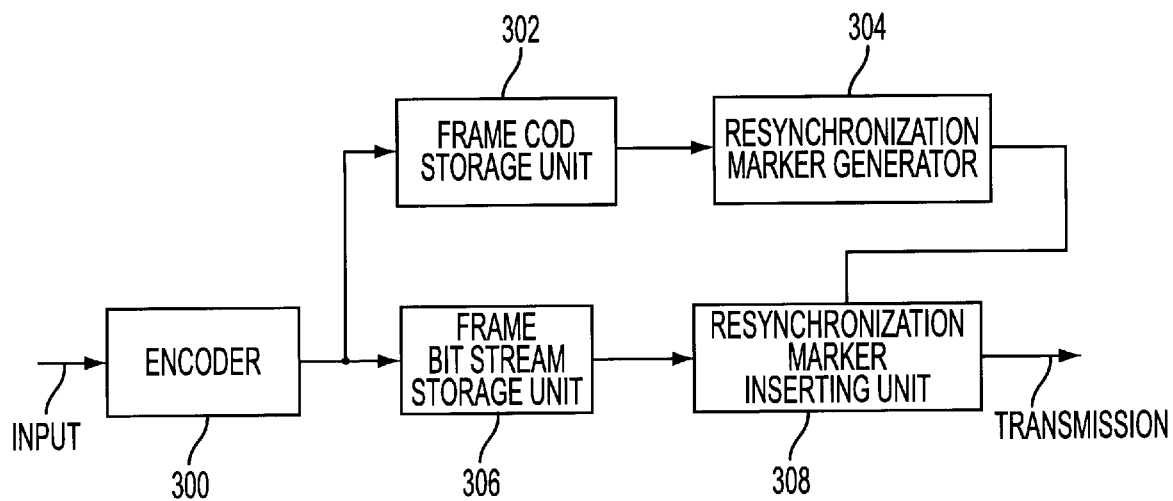
FIG. 3 is a block diagram showing a video signal transmitting apparatus according to the present invention.

FIG. 3 is a block diagram showing a video signal transmitting apparatus according to the present invention. The video signal transmitting apparatus according to FIG. 3 includes: an encoder 300; a frame COD storing unit 302; a resynchronization marker generator 304; a frame bitstream storage unit 306; and a resynchronization marker inserting unit 308. Here, the encoder is an H.263 encoder.

The operation is as follows. The encoder 300 encodes a received video frame. The frame COD storing unit 302 stores the CODs of the respective MBs determined in the encoder 300. The resynchronization marker generator 304 determines the number and insertion positions of the resynchronization markers assigned to the respective GOBs following each step of the flow chart of FIG. 2 with reference to the CODs of the respective MBs stored in the frame COD storing unit 302 and generates the resynchronization markers.

Figure 4:
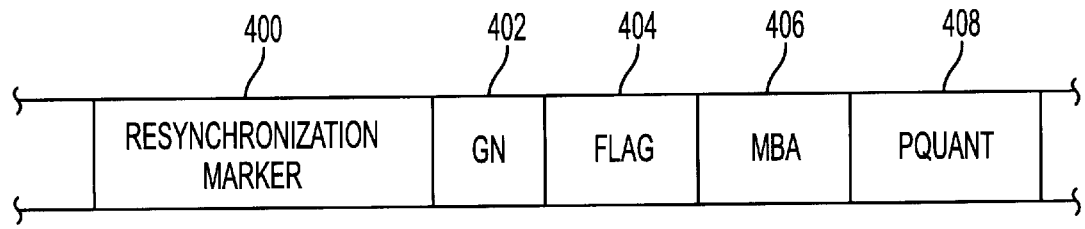
FIG. 4 shows an example of a data structure into which a resynchronization marker of FIG. 2 is inserted.

Here, the resynchronization markers can be inserted in a data structure shown in FIG. 4. A resynchronization marker field 400 is comprised of 17 bits, i.e., 16 continuous "0"s and one of "1". A GN field 402 comprised of five bits denotes GOB numbers. A flag 404 comprised of one bit is "1". An MBA field 406 comprised of five bits denotes MB numbers counted from the starting point of the GOB. A PQUANT field 408 comprised of 5 bits denotes the quantization step size of a previous MB.

The frame bit stream storage unit 306 stores a bit stream generated by the encoder 300. The resynchronization marker inserting unit 308 inserts the markers generated by the resynchronization marker generator 304 into the corresponding bit stream positions of the frame bit stream storage unit 306 and transmits the inserted markers.

A method of recovering a GOB in which a video signal, having been transmitted with resynchronization markers inserted into the frame bit stream as mentioned above, is received with generated error is described below. In the present invention, a section, in which an error is generated, is searched for by checking MBs between the resynchronization markers inserted into the GOB. Then, data of the searched error section is deleted. The error is concealed by replacing the erroneous section with the last previously recovered and error free section.

The received video signal is decoded and recovered from the transmitted motion vector of each macro block. Here, when an error is generated in the motion vector of a macro block to be recovered, the prediction of the motion vector is performed by replacing the motion vector of the current macro block in which the error is generated with the motion vector recovered immediately before the current macro block.

Also, when an error is generated in a field showing the position of the macro block in the GOB header or the slice header, a parity bit which can be used to check the parity of a corresponding field is inserted and transmitted in the present invention to determine whether an error is generated in the field showing the position of the macro block. The above-mentioned parity bit is inserted into the GOB or the slice header and is transmitted. A receiver determines whether there is an error in the field showing the position of the macro block by performing a parity check.

According to the present invention, it is possible to prevent error propagation by inserting the resynchronization markers in predetermined positions according to whether the macro blocks are skipped in the respective GOBs when the video signal is transmitted using an error-prone mobile network or radio network.

Also, it is possible to prevent error propagation in the GOB by concealing macro blocks between the resynchronization markers when the erroneous macro block is recovered.

Also, it is possible to determine whether an error is generated in the field showing the position of the macro block by inserting the parity bit into the same position in the GOB header or the slice header.

What is claimed is:

1. A method for transmitting a video signal, wherein before a video signal having a hierarchical structure of a frame, groups of blocks (GOBs), and macro blocks is received and recovered, a transmitter inserts a plurality of resynchronization markers into each GOB to prevent the propagation of errors generated in a transmission channel, wherein the insertion of the resynchronization markers comprises:

(a) assigning the number of resynchronization markers to the respective GOBs; and
   (b) inserting the assigned resynchronization markers into predetermined positions of the corresponding GOB, wherein the positions are determined to minimize the mean error propagation cost based on whether respective macro blocks positioned between the resynchronization markers to be inserted are skipped.

2. The method of claim 1, wherein the number of the resynchronization markers of the step (a) is determined by the following Equation $$r_j = nint\left(R_F \times \frac{N_j}{N_F}\right)$$

where $$nint\left(R_F \times \frac{N_j}{N_F}\right),$$

$R_F$, $N_j$, and $N_F$ respectively represent an integer truncation operation, the number of resynchronization markers assigned to a frame, the number of macro blocks which are not skipped in a jth GOB, and the number of macro blocks which are not skipped in the frame.

3. The method of claim 2, wherein the number of assigned resynchronization markers is controlled to be $r_j=\max\{\min(r_j, N_j-1), 0\}$.

4. The method of claim 1, wherein the mean error propagation cost of a jth GOB is determined by the following Equation in the step (b)

$$\bar{E}_{r,j}(k_1, \ldots, k_r) = \sum_{i=1}^{k_1}(k_1 - i + 1)p_e + \sum_{i=k_1+1}^{k_2}(k_2 - i + 1)p_e + \ldots + \sum_{i=k_{r-1}+1}^{k_r}(k_r - i + 1)p_e + \sum_{i=k_r+1}^{m}(m - i + 1)p_e = \left(2\sum_{i=1}^{r}k_i^2 - 2\sum_{i=1}^{r-1}k_ik_{i-1} - 2mk_r + m^2 + m\right)p_e$$

where $r$, $k_i$ ($i \in \{1, 2, \ldots, r\}$), $p_e$, and $m$ respectively represent the number of the resynchronization markers to be additionally inserted, the positions of the resynchronization markers to be inserted, a probability that an error is generated in each macro block, and the number of macro blocks which are not skipped in the jth GOB.

5. The method of claim 4, wherein the position $k_i$ of an ith marker is determined by the following Equation $$k_i^* = \frac{m}{r+1}i, i \in [1, 2, \ldots, r]$$

to minimize the mean error propagation cost where $r_j$ is the number of the resynchronization markers assigned to the jth GOB.

6. A video signal transmitting apparatus for inserting a plurality of resynchronization markers into groups of blocks (GOBs) to prevent the propagation of errors generated in a transmission channel before a video signal having a hierarchical structure of a frame, the GOBs, and macro blocks is received and recovered, comprising:

an encoder for encoding image data;
   a frame code storing unit for storing respective CODed macro block indication (COD) values determined by the encoder;
   a frame bitstream storing unit for storing a bit stream generated by the encoder;
   a resynchronization marker generator for determining the number and positions of the resynchronization markers to be inserted into the bit stream based on the COD values stored in the frame code storing portion and generating the resynchronization markers; and
   a resynchronization marker inserting unit for inserting the generated resynchronization markers into corresponding positions of the stored bit stream and transmitting the generated resynchronization markers.

7. A method for recovering a received video signal having a hierarchical structure of a frame, groups of blocks (GOBs), and macro blocks by inserting a plurality of resynchronization markers into predetermined positions of the corresponding GOBs, wherein the positions are determined to minimize the mean error propagation cost based on whether respective macro blocks positioned between the resynchronization markers to be inserted are skipped, to prevent the propagation of errors generated in a transmission channel, comprising:

detecting an error from a macro block between inserted resynchronization markers;
   deleting recovered data of a section in which the error is detected; and
   concealing the error of the section by replacing the deleted data section with the data of the immediately preceding concealed section.

8. A video signal recovering method for recovering a macro block in a position by reading a field showing the position of the macro block among headers of the block group in a video signal having a frame, GOBs, and macro blocks,
   wherein it is determined whether an error is generated in a field showing the position of the macro block by performing a parity check with respect to the macro block from the received video signal comprising a parity bit inserted into the field showing the position of the macro block.

* * * * *